United States Patent
Wu et al.

(10) Patent No.: US 6,564,224 B1
(45) Date of Patent: May 13, 2003

(54) METHOD AND APPARATUS FOR MERGING MULTIPLE ROAD MAP DATABASES

(75) Inventors: Xiaoyi Wu, Fremont, CA (US); W. Clayton Collier, San Ramon, CA (US); Rajiv K. Synghal, Concord, CA (US); James Whitaker, Livermore, CA (US)

(73) Assignee: Kivera, Inc., Oakland, CA (US)

( * ) Notice: Subject to any disclaimer, the term of this patent is extended or adjusted under 35 U.S.C. 154(b) by 0 days.

(21) Appl. No.: 09/539,721

(22) Filed: Mar. 30, 2000

Related U.S. Application Data

(60) Provisional application No. 60/169,198, filed on Dec. 6, 1999.

(51) Int. Cl.[7] ................................. G06F 17/30
(52) U.S. Cl. ................................... 707/104.1
(58) Field of Search .................. 707/104.1, 6; 340/995; 701/200, 209, 211

(56) References Cited

U.S. PATENT DOCUMENTS 5,546,107 A * 8/1996 Deretsky et al. ............ 340/295
5,938,720 A * 8/1999 Tamai ........................ 701/200

* cited by examiner

Primary Examiner—Diane D. Mizrahi
Assistant Examiner—Apu Mofiz
(74) Attorney, Agent, or Firm—Dergosits & Noah LLP

(57) ABSTRACT

A method and apparatus for combining two dissimilar road map databases of a given geographic region are provided. The road map database differ in degree of coverage or accuracy of coverage, or both, of the geographic region. Each database includes data defining a plurality of roads. A first set of loops is defined from roads represented in a first of the two road map databases. For each of the first set of loops, a corresponding loop is identified from roads represented in a second of the two road map databases, to define a second set of loops. Each loop of the second set of loops may include one or more links, and each link represents a portion of a road represented in the second road map database. A set of output loops corresponding to the first set of loops is generated to form an output road map database. Links enclosed within loops of the second set of loops and not represented in the first road map database are then copied into the set of output loops, such that the output road map database represents a combination of the first road map database and the second road map database.

19 Claims, 9 Drawing Sheets

METHOD AND APPARATUS FOR MERGING MULTIPLE ROAD MAP DATABASES

This application claims the benefit of Provisional U.S. Patent application No. 60/169,198, filed on Dec. 6, 1999.

FIELD OF THE INVENTION

The present invention relates to road map databases for use by map-generation and route-finding devices and the like. More particularly, the present invention relates to techniques for combining multiple road map databases into a single combined database.

BACKGROUND OF THE INVENTION

Map generation and route-finding devices and services are becoming increasingly more common and are gaining widespread use in daily life. Common examples of such devices and services are automobile-based and hand-held navigation systems and Internet-based mapping and route-finding services. It is desirable to have the most complete road data as possible for use with such devices and services. Road map data for use in such systems currently is available from more than one provider. However, no provider is known to provide coverage that is both complete and accurate, for any significantly-sized portion of the United States.

Two well-known providers of road map data are Navigation Technologies (NavTech) of Rosemont, Ill., and Geographic Data Technology, Inc. (GDT) of Lebanon, N.H. The road map data currently available from NavTech is notable for its high accuracy and reliability. The coordinates provided by NavTech are highly consistent with those provided by the Global Positioning System (GPS). The representations of roads in this data set are extremely accurate and very closely reflect the actual roads. However, NavTech's data set is not complete. Most of the land area of the United States has only partial coverage by NavTech, with data covering only the main highways and extremely sparse coverage of local roads. Currently, various vehicle navigation systems rely upon the NavTech data set. However, the incompleteness of the NavTech data set can create customer dissatisfaction. Customer dissatisfaction can lead to a significant loss of sales of navigation systems, because the data set does not cover areas where customers live and/or travel.

In contrast, the road map data currently available from GDT is much more complete than NavTech's, with effectively 100% coverage of areas in the United States. However, GDT's data set has significant geographical position errors as well as geometry problems. Using the GDT data alone in an in-vehicle navigation system, for example, would be a dubious choice, because the GPS system would report very different coordinates for ground positions than the GDT map indicates. GDT data often show extremely inaccurate representations of ramps and complicated road configurations. Because of the discrepancies between the GDT data set and reality, a user of an in-vehicle navigation system using this data could become hopelessly lost quite regularly. GDT data, therefore, has not been used to date for highway navigation.

SUMMARY OF THE INVENTION

The present invention includes a machine-implemented method and an apparatus for combining two road map databases. A first road map database and a second road map database have different degrees of coverage and different coverage accuracies for a given geographic region. The two road map databases are accessed, and an output road map database representing a combination of the first road map database and the second road map database is generated.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for combining two road map databases of a geographic region are described. The two road map databases differ in degree of coverage of the geographic region or accuracy of coverage of the geographic region, or both. The described technique can be used to merge the two data sets of two vendors to produce a data set that takes advantage of one vendor's more complete coverage of a geographic region and the second vendor's greater accuracy. In effect, the technique "sews" the data sets together like a patchwork quilt.

I. Overview

As will be described in greater detail below, an embodiment of the technique is as follows: A first set of loops is defined from roads represented in a first of the two road map databases. For each of the first set of loops, a corresponding loop is identified from roads represented in a second of the two road map databases, to define a second set of loops. Each loop of the second set of loops may include one or more links, each of which represents a portion of a road in the second road map database. A set of output loops corresponding to the first set of loops is generated to form an output road map database. Links enclosed within loops of the second set of loops but not represented in the first road map database are copied into the set of output loops. As a result, the output road map database represents a combination of the first road map database and the second road map database.

It should be noted that in this description, references to "one embodiment" or "an embodiment" mean that the feature being referred to is included in at least one embodiment of the present invention. Further, separate references to "one embodiment" in this description do not necessarily refer to the same embodiment, however, neither are such embodiments mutually exclusive.

The techniques described herein may be embodied in software, at least in part. That is, in some embodiments, the techniques may be carried out in a computer system in response to its microprocessor executing sequences of instructions contained in a memory device. In other embodiments, however, hard wired circuitry may be used in place of, or in combination with, software instructions to implement the present invention. Thus, the present invention is not limited to any particular combination of hardware and/or software, nor to any particular source for the instructions executed by a computer system.

Figure 1A:
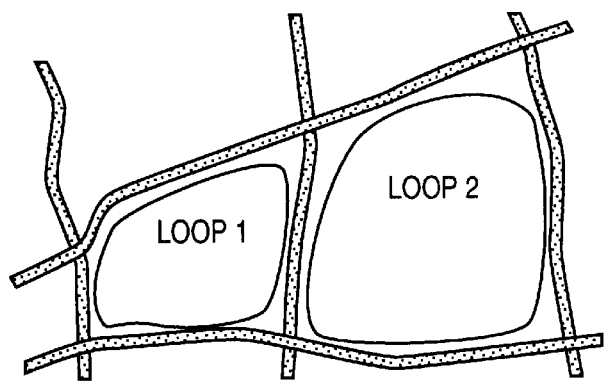
FIG. 1A shows a representation of part of a first (Vendor#1) road map database, which provides accurate but incomplete coverage of a geographic area.
Figure 1B:
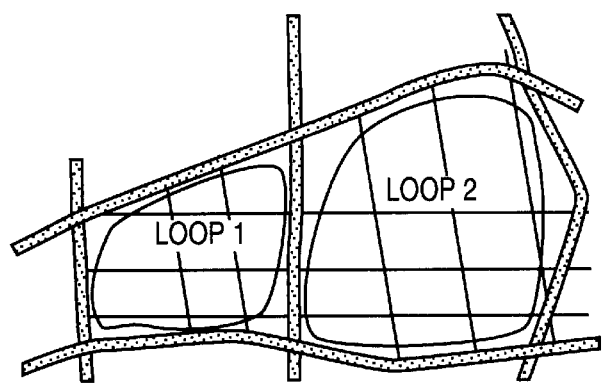
FIG. 1B shows a representation of part of a second (Vendor#2) road map database, which provides more complete but less accurate coverage of the geographic area than that of FIG. 1A.
Figure 1C:
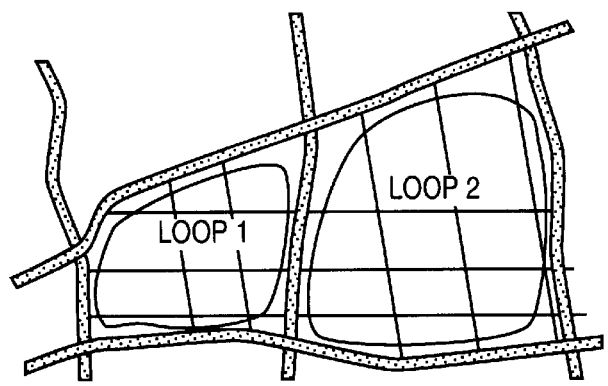
FIG. 1C shows a representation of part of an output database that represents a combination of the first (Vendor#1) road map database and the second (Vendor#2) road map database, providing accurate and more complete coverage.

In this description, "Vendor#1" represents a provider of road map data whose data set is more accurate than that of a second provider, "Vendor#2". However, the data set of Vendor#2 is more complete in coverage than that of Vendor#1. Thus, an example of Vendor#1 in the context of this description is NavTech, while an example of Vendor#2 is GDT. Note, however, that the techniques described herein are not restricted in applicability to the data of any particular vendors. As noted, the present technique essentially "sews" the data sets of Vendor#1 and Vendor#2 together like a patchwork quilt. This process is illustrated in FIGS. 1A, 1B and 1C. FIG. 1A illustrates a portion of Vendor#1 data showing certain major roads. FIG. 1B shows the corresponding portion of Vendor#2 data, in which more roads are represented than in Vendor#1's data, however, Vendor#2's roads are distorted. FIG. 1C illustrates the merged data that results from applying the present technique, in which the merged data includes the accuracy of Vendor#1 (for the roads which Vendor#1 covers) and the completeness of Vendor#2.

Figure 2A:
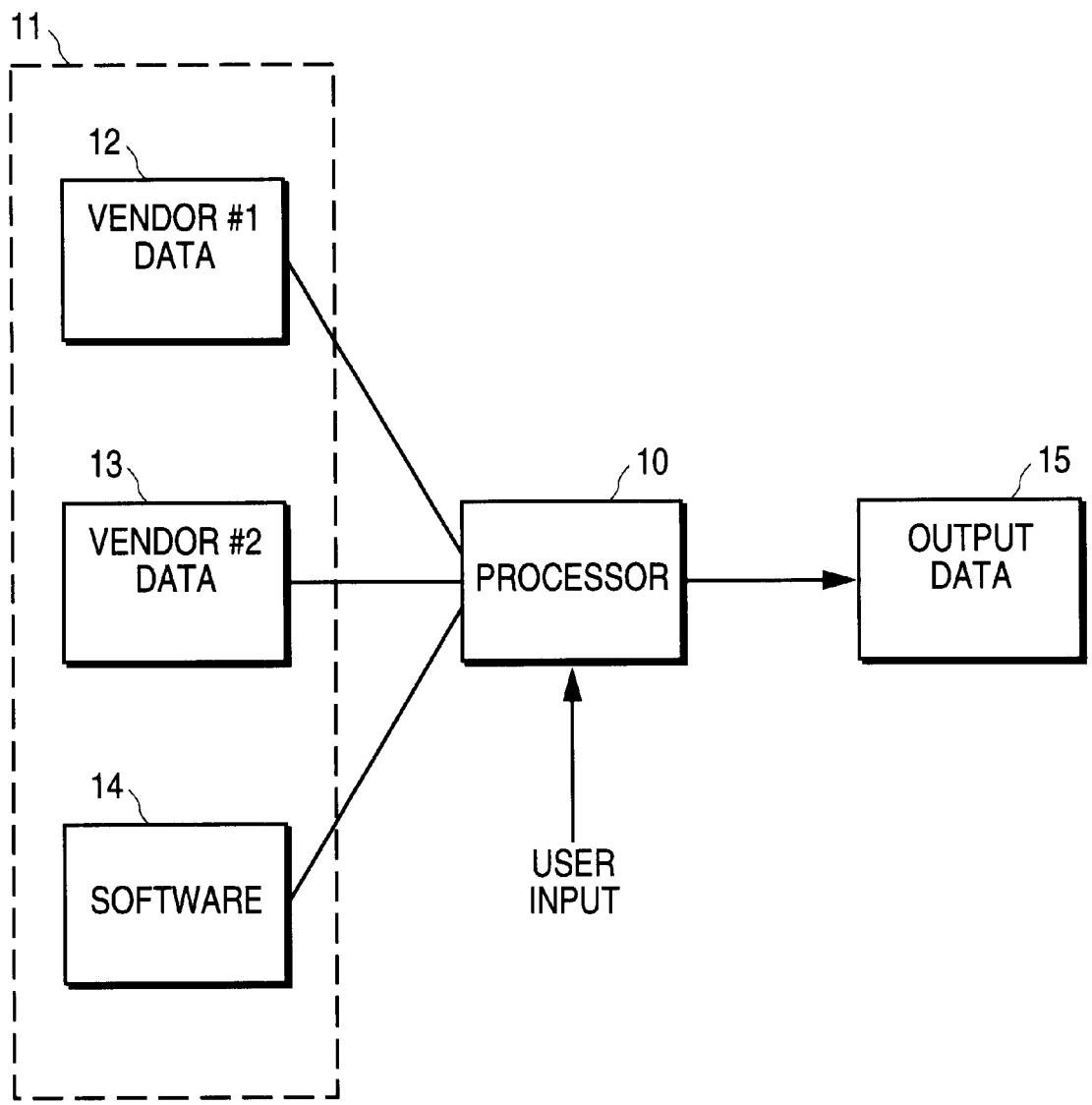
FIG. 2A illustrates a system for combining two road map databases into a single road map database.

FIG. 2A illustrates a system for combining two road map databases into a single database. A road map database 12 of Vendor#1 and a road map database 13 of Vendor#2 are stored within a storage facility 11. Also stored in the storage facility 11 are sequences of software instructions 14 for configuring a processor 10 to carry out the techniques described herein, to generate a road map database 15 representing a combination of database 12 and database 13. The soft ware 11 may represent one or more distinct software programs, modules, algorithms, etc., each for performing a separate function, as described in detail below. Storage facility 11 may represent one or more physically separate storage devices, example of which are: magnetic disk or tape; magneto-optical (MO) storage device; any of various types of Digital Versatile Disk (DVD) or compact disk ROM (CD-ROM) storage; random access memory (RAM); read-only memory (ROM); flash memory; or the like, or a combination of such devices. Hence, databases 12 and 13 and software 14 may each be stored in separate physical storage devices. In addition, processor 10 may represent one or more physical processing devices, examples of which are: microprocessors, microcontrollers, Application Specific Integrated Circuits (ASICs), Field Programmable Gate Arrays (FPGAs), or any other processing device, or a combination of such devices. Such processing devices (if more than one) may operate in parallel or sequentially.

Figure 2B:
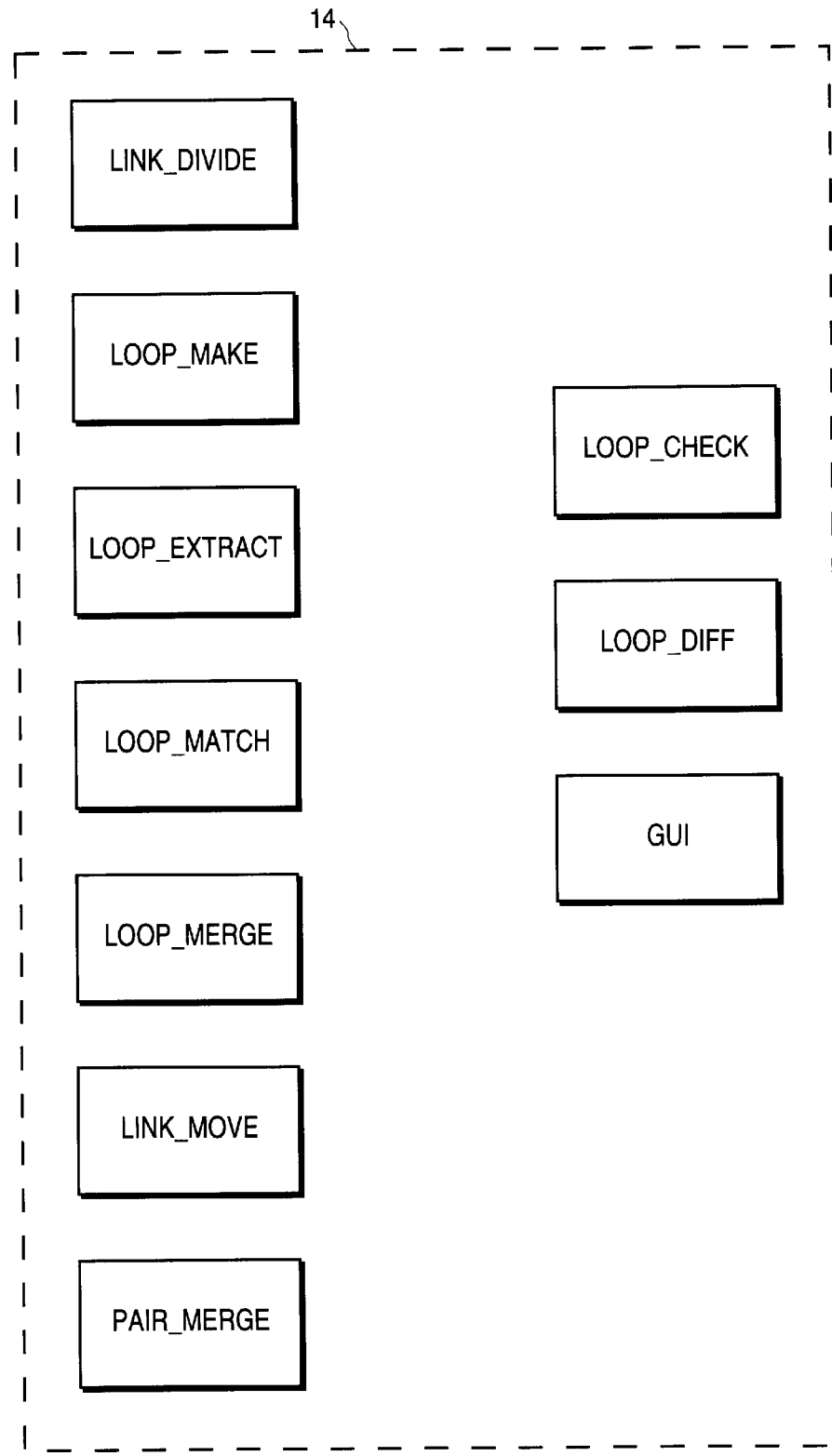
FIG. 2B shows modules of the software 14 of FIG. 2A.

FIG. 2B shows the software 14 in greater detail, according to one embodiment.

As illustrated, the software 14 includes a number of modules, or programs, for performing different functions, namely: link_divide, loop_make, loop_extract, loop_match, loop_merge, link_move, pair_merge, loop_check, loop_diff, and a Graphical User Interface (GUI) tool. These modules are described below in detail. Note that these modules may be packaged in any of a variety of different forms. For example, these modules may be packaged together, such that software 14 is a single software application. Alternatively, these modules may each be packaged separately (e.g., each as a separate software application), or certain ones of these modules may be packaged together to form one or more software applications. Further, these modules may be configured to be invoked automatically (e.g., sequentially, each by a previously-invoked module), or a user may be required to invoke one or more of these module.

Figure 3:
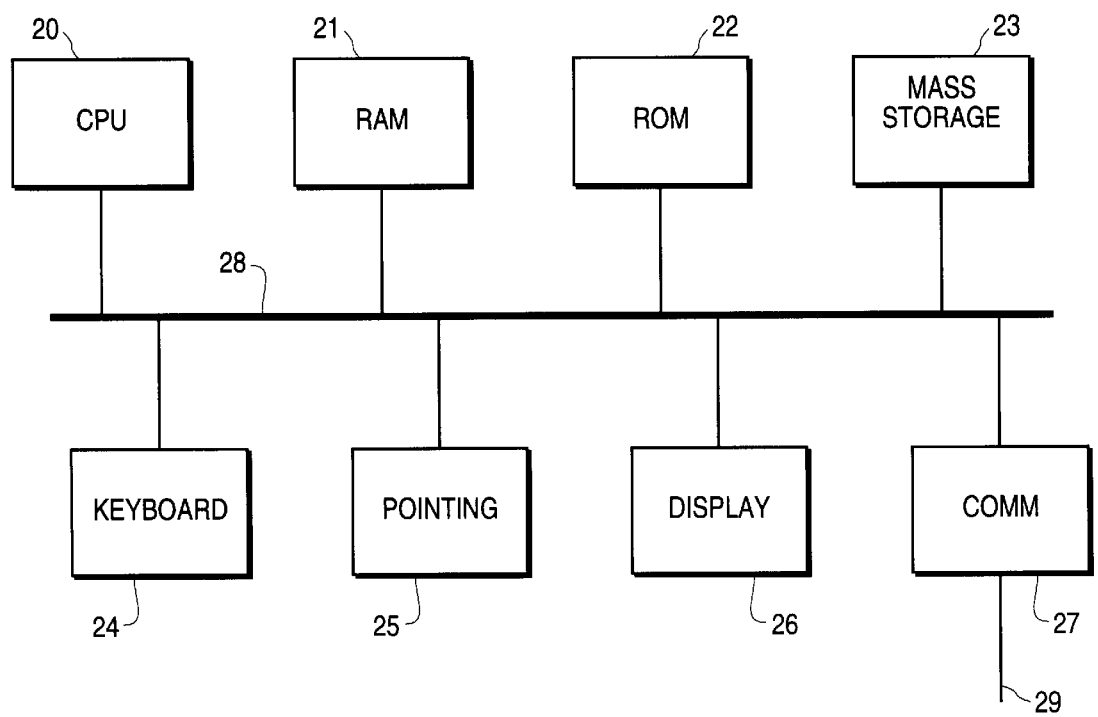
FIG. 3 shows a computer system in which the present invention can be implemented.

The techniques described herein may be implemented using one or more computer systems. Hence, individual physical devices represented by storage facility 11 and processor 10 (FIG. 2A) may be associated with different computer systems. FIG. 3 shows an example of one such computer system in which the techniques described herein may be carried out. The computer system includes a central processing unit (CPU) 20 (e.g., a microprocessor), RAM 21, and ROM 22, each connected to a bus system 28. The bus system 28 may include one or more buses connected to each other through various bridges, controllers and/or adapters, such as are well-known in the art. For example, the bus system may include a "system bus" that is connected through an adapter to one or more expansion buses, such as a Peripheral Component Interconnect (PCI) bus. Also coupled to the bus system 28 are a mass storage device 23, a keyboard 24, a pointing device 25, a display device 26, and a communication device 27.

Mass storage device 23 may include any suitable device for storing large volumes of data, such as a magnetic disk or tape, MO storage device, or any of various types of DVD or CD-based storage device. The pointing device 25 may be any suitable device for enabling a user to position a cursor or pointer on the display device 26, such as a mouse, trackball, touchpad, or the like. The display device 26 may be any suitable device for displaying alphanumeric, graphical and/or video information to a user, such as a cathode ray tube (CRT), a liquid crystal display (LCD), or the like, and associated controllers. The communication device 27 may be any device suitable for or enabling the computer system to communicate data with a remote processing system via a data link 29, such as a conventional telephone modem, a cable modem, an Integrated Services Digital Network (ISDN) adapter, a Digital Subscriber Line (xDSL) adapter, an Ethernet adapter, or the like.

Thus, the processor 10 in FIG. 2A may be embodied as CPU 20 in FIG. 3. Similarly, the storage facility 11 in FIG. 2A may be embodied as any one or more of RAM 21, ROM 22, or mass storage device 23.

II. Details of the Merge Technique

Before describing the merge technique further, it is useful to define certain terms. The following definitions are used in this description:

A "link" is a portion of a road represented in a road map database.

A "segment" is portion of a link. A link can be broken into one or more segments.

A "node" is a geographical point at which two or more segments begin or end.

A "double-digitized" road is a divided road with at least one lane traveling in each of two directions, for which the opposite directions of travel are represented in the database as different segments.

The above-mentioned "sewing" together of databases is,accomplished by finding corresponding closed paths of travel ("loops") along roads contained in both the Vendor#1 and Vendor#2 data sets. A Vendor#1 loop is defined as a path of segments in the Vendor#1 data that makes the sharpest possible right turns at every point, until it comes back to the point of origin. The use of right hand turns is arbitrary—all left turns can be used instead. A Vendor#2 loop is defined as the closest match to a given Vendor#1 loop; it is comprised of roads in Vendor#2 data that are duplicated in both data sets. The software 14 (FIG. 1) identifies the common road intersections occurring in both the Vendor#1 loop and the Vendor#2 data sets along these loops. These intersections are called "control nodes". The links between the control nodes form a loop path.

Once a complete, closed-loop path has been generated and matched, the software 14 then copies all the Vendor#2 links inside each loop and shifts their geographical positions, if necessary, to compensate for the differences between the two data sets in the geographcal positions of corresponding intersections. The software 14 then attaches this shifted data to the Vendor#1 data set, adding to but not changing any elements from the original Vendor#1 data set.

Figure 4:
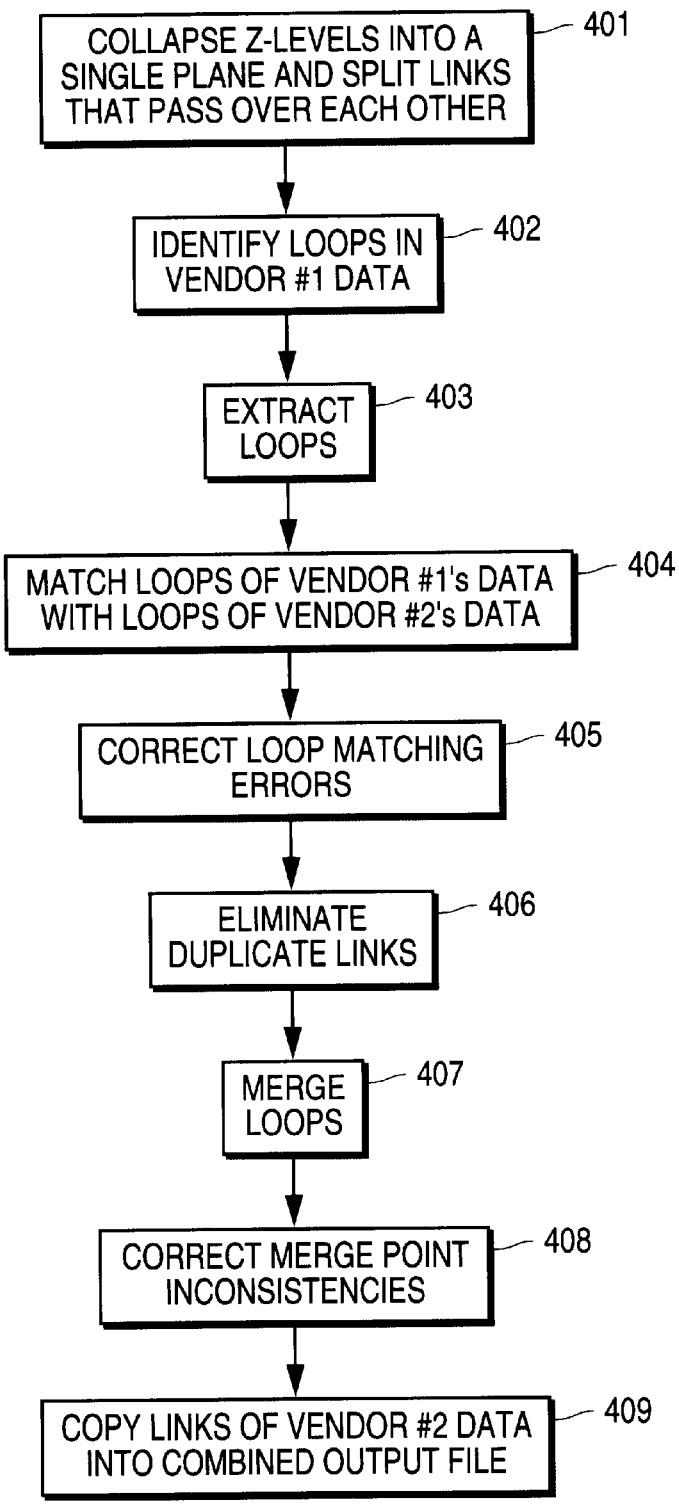
FIG. 4 is a flow diagram illustrating an overall process for combining two road map databases into a single road map database.

FIG. 4 illustrates in greater detail a sequence of processes (stages) that can be used to produce a complete set of maps that represent substantially all roads in the U.S. (or other geographic region of interest), with less distortion than was in the Vendor#2 data source. The first stage 401 in this process is the flattening of the Vendor#1 data into a single plane by removing z-level (elevation) information. Also at stage 401, links that pass over each other are split apart using the link_divide module (FIG. 2B) of software 14. The locations at which the links are split correspond to every point at which one road passes over another, such as where roads pass underneath an overpass. The resulting fragments of links are called "segments". The next stage 402 is to identify all of the loops in the Vendor#1 data, which is done by the loop_make module of software 14. Loop data is then extracted from the Vendor#1 loops and loops of Vendor#2 at stage 403, using the loop_extract module of software 14. At stage 404, the Vendor#1 loops are matched with the correct Vendor#2 loops, using the loop_match module of software 14. At stage 405, any errors in the loop matching process are detected and corrected. In one embodiment, this stage 405 involves both an automated process and a manual (user-directed) process—this may be desirable to achieve the greatest degree of reliability. This stage 405 is done using the loop_check, loop_diff, and GUI modules of the software 14. Note, however, the manual part of this process can be omitted, if desired, such that the process is fully automated.

Certain links may appear in both the Vendor#1 data and the Vendor#2 data, as described below. Such duplicate links are eliminated at stage 406. Next, the Vendor#1 loops and the Vendor#2 loops are merged at stage 407 using a program of software 14 known as loop_merge. This merging may result in certain discontinuities in roads due to inconsistencies between the Vendor#1 and Vendor#2 data sets. Therefore, at stage 408 any such inconsistencies are detected and corrected using the pair_merge module of software 14. Finally, at stage 409 links from the Vendor#2 data which are not represented in the Vendor#1 data are copied into an output database with the Vendor#1 data, to form a combined output database. Stage 409 is done using the link_move module of software 14. This output database includes all of the links in the Vendor#2 data, with the accuracy of the Vendor#1 data (at least for those links represented in the Vendor#1 data).

A. Collapsing Z-Levels and Splitting Links

The stages of the merge process will now be described in greater detail. As noted, following the elimination of z-level information at stage 401, the link_divide module of software 14 splits apart links that pass over each other. In one embodiment, link_divide performs the following actions:

1) load a simple representation of each and every link in an entire Database Coverage Area (DCA) into computer memory;
2) sort the array by latitude (major sort key) and longitude (minor sort key) to position all nearby links in the same area of memory; and
3) check every link against every other link in the vicinity to search for links which cross over each other. These links are split at the point of crossing.

Working with loops confined to a single plane greatly simplifies the algorithms of the merge process and makes the task of verifying loops easier for a human inspector-adjuster. Note that the merge process can function without this operation, but without it the resulting loops can become chaotic, since the algorithm would have to take right turns at the ends of each link. This causes the loop identification stage 402 to identify loops that do not make simple turns, but rather define extremely confusing patterns wherever there are overpasses. Such erratic loops are very difficult to work with in a manual verification process.

B. Loop Identification

Figure 5:
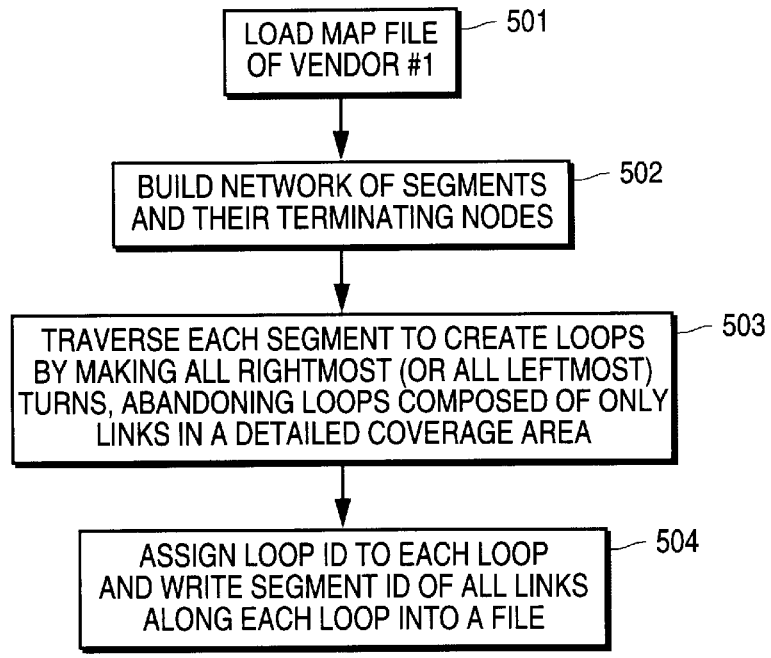
FIG. 5 is a flow diagram illustrating a loop identification stage.

The next stage 402 is to identify loops in the Vendor#1 data. FIG. 5 illustrates the loop identification stage 402 in greater detail, according to one embodiment. The loop_make module of software 14 creates a loop file for every loop it identifies. This program operates as follows: At stage 501, the entire map of the U.S. (or other region of interest) is loaded into memory at once, storing an extremely simplified representation of each segment. At stage 502, a network of segments and their terminating nodes is built from this data. At stage 503, this network is traversed by examining twice each segment that is encountered, once in each of the two possible directions of travel. For every segment that has not been traversed in the current scanning direction, loop_make attempts to create a new loop. Starting at one end of the segment, the loop_make attempts to travel along the network in the direction away from the current segment, making the rightmost possible turn onto another segment. Again, the decision to make right turns is arbitrary; all left turns can be used instead. Loop_make then repeats this process with every segment encountered until its path of travel reaches the original starting segment. In every case, the loop's path reaches the original starting segment. When a newly created loop is identified as being composed only of links that are marked as being part of a Vendor#1 DCA, it is abandoned, as this is a loop for which the Vendor#2 data will have no reliable additional links to add. Finally, at stage 504, the path traveled to create each usable loop is assigned a loop identification (ID) number, and the segment ID of each and every segment traversed along the loop is written out into a file.

There can be thousands of Vendor#1 loops throughout a given region, such as the U.S. (in the case of Navtech, there are approximately 240,000 loops). Many loops are very small and simple and have no Vendor#2 data that can be clipped out and inserted into the matching Vendor#1 loop. These loops are called "empty loops" or simply "empties". Typically, empty loops are generated inside of double-digitized highways in the Vendor#1 data, between pairs of overpasses. Other types of empties include the inside circles and triangles created by the ramps surrounding an overpass. NavTech data includes approximately 140,000 empties, defined with respect to GDT's data set. In one embodiment, all loops, including the empties, are passed to human inspector-adjusters during an error correction process, as described below.

Loop_make can create loops ranging from small 30-foot squares inside the intersections of two doubly digitized highways to one representing the entire coastline of California. There may be cases when a loop consists of only one circular link and cases where a loop includes thousands of links.

C. Loop Extraction

Figure 6:
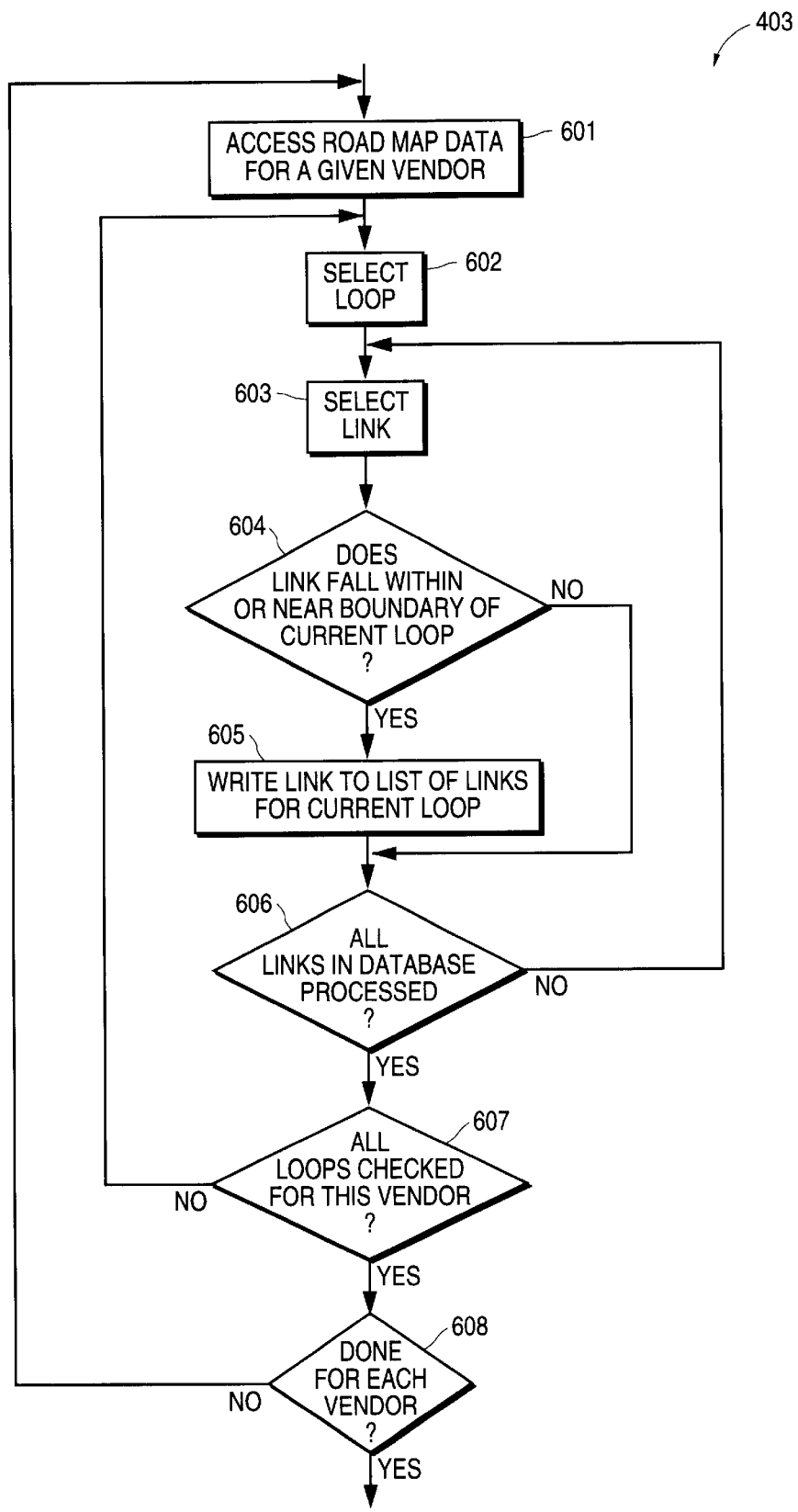
FIG. 6 is a flow diagram illustrating a loop extraction stage.

The next stage after loop identification is the loop extraction stage 403. FIG. 6 shows the loop extraction stage 403 in greater detail, according to one embodiment. As noted, this stage is performed by the loop_extract module of software 14. Loop_extract copies data from Vendor#1's DCA files (which are extremely large in the case of NavTech) and Vendor#2's files (which are smaller, state-based files in the case of GDT). For each loop, loop_extract creates two small, quickly loadable files for the local areas around the boundaries of the identified loop.

A desirable way to perform this operation on a machine with sufficient memory and address bits is to load an entire DCA file into memory and then load all Vendor#1 loops identified by loop_make into memory. The algorithm then cycles through the Vendor#1 data, one loop at a time and compares each link to a polygon (i.e., a rectangle defined by latitude and longitude coordinates) corresponding to an area around each loop. Each link that is physically inside or intersecting the polygon is added to a list for that loop. Once all the links are scanned, the algorithm then starts opening one output "mini-map" file at a time, writing all of the mini-map files in succession (e.g., about 240,000 mini-map files, corresponding to 240,000 loops, for the case where NavTech is Vendor#1).

The foregoing process is illustrated in FIG. 6, according to one embodiment. At stage 601, loop_extract accesses the road map data for a given vendor, initially Vendor#1, and then Vendor#2 in a subsequent iteration. At stage 602, a loop from that database is selected, and at stage 603 a link from that database is selected. It is then determined at stage 604 whether the selected link falls within the boundary of the selected loop or outside-but-nearby the boundary of the loop (i.e., within the above-mentioned polygon). If either case is true, then the selected link is written to a list of links for the selected loop at stage 605. If not, the process proceeds to stage 606. If all links in the database have been processed (stage 606), then the process proceeds to stage 607. If not, the process repeats from stage 603 with the selection of a new link. At stage 607, it is determined if all loops have been checked for this vendor; if not, the process repeats from stage 602 with the selection of a new loop. Otherwise, the process proceeds from stage 608, in which it is determined if both vendors' data have been processed. If not, the entire process repeats for the next vendor (e.g., Vendor#2). Otherwise, the process exits.

Unfortunately, with currently available computer technology, the above implementation may consume more memory than is commonly available, and requires a 64-bit data space for the NavTech and GDT example. Hence, the following alternative embodiment may be used as a slower, compromise solution. In this alternative embodiment, loop_extract opens a loop file, stores it in memory as a polygon (a bounding box for each loop), then closes the loop file. It then opens an output mini-map file for that loop. It keeps opening mini-map files until it reaches the operating system's limit for open files. Then loop_extract begins loading one link at a time from the DCA file, and checking that the link's location falls within or near the bounds of the polygon created by each loop of the currently-open mini-map files. It writes that link out into the output files of each of the loops that it matches. When loop_extract finishes one pass through the DCA, it closes each of the mini-map files and then re-opens another one for each of the loops to store the other vendor's data. Loop_extract then opens the other vendor's DCA file, and repeats the process, extracting all the links from the other vendor's DCA that correspond to the area surrounding the loop. When this process is finished, loop_extract closes all the files, and starts again, reopening the next set of mini-map files until the operating system won't allow any more to be opened, and it writes out mini-map files for those. This cycle is repeated, as necessitated by the operating system's limit on the number of open files, until all loops are done.

D. Loop Matching

The next stage after loop extraction is the loop matching stage 404. As noted above, this stage is performed using the loop_match module of software 14. The input of loop-match is the set of mini-map files generated during the loop extraction stage 403. Loop_match creates a "match file" (representing a Vendor#2 loop), which contains the algorithm's best guess about which links and nodes in the Vendor#2 data match the links and nodes in the Vendor#1 loop created by make_loop. Loop_match contains a set of heuristic (comprised of mathematical formula-based guesses) algorithms that generates its best approximation of the Vendor#1 loop within the Vendor#2 data.

Loop_match must deal with a significant amount of human error. A typical loop requires the program to make thousands of heuristic decisions about the most likely way to interpret the map data. The specific heuristic decisions that are employed are discretionary, however, examples of such heuristics are described below. Because it is likely that no set of heuristics will be perfect, the end result of loop_match may be that a small percentage of the loops that will be used by the merge process are incorrectly matched. However, those loops that are not matched correctly require only a few corrections at the next processing step.

Figure 7:
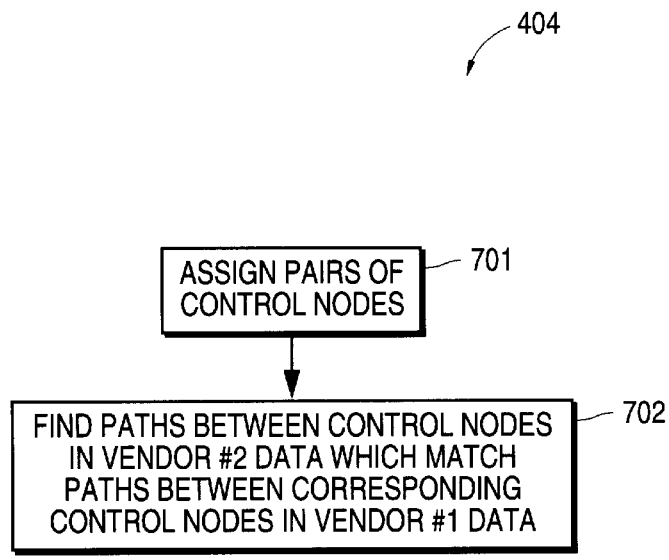
FIG. 7 is a flow diagram illustrating a loop matching stage.

FIG. 7 illustrates the loop matching stage 404 in greater detail. Loop matching is composed of first assigning "control nodes" at stage 701, and then finding, at stage 702, paths between the control nodes in the Vendor#2 data which match the paths between the corresponding control nodes in the Vendor#1 data. A control node is one of a pair of nodes. A node is generally a street intersection. One member of each control node pair represents a node along a Vendor#1 loop. The other member of the pair represents the corresponding node in the Vendor#2 data. Each node pair corresponds to locations of shared map features, like road intersections or sharp road bends.

In some instances a Vendor#1 node has no corresponding "good" Vendor#2 node. This phenomenon is usually the result of mismatched representations of the same area. When this happens, no nodes are placed in these locations. Note that it is extremely rare for the longitudes and latitudes of the node pair to be identical. Sometimes this difference is a little as one meter; occasionally it can be over 200 meters.

Control nodes are used as reference points around which to "stretch" the Vendor#2 road links located inside the boundaries of the loop. This Vendor#2 data is extracted from inside the polygon formed by each Vendor#2 loop path and is then inserted into the corresponding polygon formed by each Vendor#1 loop. The data is stretched around the control nodes like rubber bands by the loop_merge program, described below. This operation ensures that distortions produced by biases from single points are minimized. It is desirable for there to be as many control nodes as possible, since more control nodes tend to smooth out the distortions.

1. Control Node Selection

Loop_match selects control nodes based upon the following criteria: 1) an index created from street name match/mismatch; 2) differences in angles between corresponding segments; 3) dissimilarities in the divergence patterns of the links as they leave each node; 4) dissimilarities in one way information in corresponding links at that node; and 5) the physical distance between the nodes. Additional criteria may also be used, if desired. Selection of control nodes is subject to error, particularly because of possible errors in the Vendor#2 data set and different representations of the same road areas (particularly freeway on- and off-ramp configurations) in that data. Control nodes are selected by traveling along the path of a Vendor#1 loop and looking for candidate Vendor#1 control nodes. As each candidate node is selected from the loop, the Control Node Selection algorithm of loop_match searches the nearby Vendor#2 area for a counterpart.

As each node in the Vendor#1 loop is investigated, loop_match iterates through all the nodes along the Vendor#1 loop. For each of these nodes, it scans all Vendor#2 nodes within a given radius (e.g., 400 meters). For each of these Vendor#2 nodes, loop_match assigns a number called kcost. The kcost value represents the strength of the bond between each Vendor#2 node scanned and the original Vendor#1 node. For each Vendor#1 node, loop_match connects the two nodes together with the minimum kcost. This minimum kcost must be less than a threshold value to use the Vendor#1 node as part of a control node pair. If the threshold is not met, the Vendor#1 node is not used as part of the control pair. Loop_match makes several passes at the data, using less stringent criteria each time. This results in more nodes being placed and therefore less manual intervention, if any.

Street name errors may occur in both the Vendor#1 and Vendor#2 data sets. Street names can be transposed or simply wrong. When the street names do not correspond between the two data sets, the control node selection algorithm abandons the name-matching criteria and instead relies upon geometric heuristics. For example, the algorithm then looks for similarities in the shapes and angles of the roads to determine a control node pair. In such cases, extremely close matches are considered to be of sufficiently low kcost to warrant the algorithm creating a control node pair.

Street names can be considered similar if, for example, they are: 1) both a ramp; 2) both have identical names; 3) both have identical numbers in their street names; and/or 4) have identical numbers in their street names when spaces and minus signs and directional characters such as 'N's 'S's 'W's and 'E's are removed from both names. All segment names are compared for each control node candidate pair. The primary purpose of this action is to match the names of all the links at a node, to increase the confidence level of the current node being a match. This confidence level is proportional to the square of the number of unique names found at that node that correspond. Thus, when a node represents an intersection that has only one good match or a pair of good matches, that corresponds to a single road, and the crossroad's name does not match. If the crossroad's name matches in addition to the current road, that greatly increases that the correct node has been selected. If more than two crossroads are found with matching names at this spot, there is clearly a match, and the assigned weighting is very high.

The control node selection algorithm considers that links at each Vendor#2 candidate node should proceed out from that node in approximately the same angles as their counterparts at the reference Vendor#1 node. Large angular differences produce dramatically high costs to filter out dissimilar points.

The control node selection algorithm also follows segments out from a node and ensures that corresponding links are parallel for the entire length of each link. When they diverge in a 'Y' shape, a high kcost is incurred.

Segments are also qualified on the basis of how close together their paths follow each other. Two segments whose paths are parallel are considered very close matches. Two segments whose paths diverge produce large kcost. The path differences are determined by taking one node and superimposing it upon another. All segments at a potential Vendor#2 control node are compared with all segments of a Vendor#1 candidate control node. This is done to determine that the links protruding from both nodes line up and ultimately point in the same or similar directions.

On those occasions when a one-way street passes through a node, the counterpart node should also have a corresponding one-way street that is parallel and allows the same direction of travel. This heuristic is used to resolve potential confusion in relation to double-digitized highways.

The control node selection algorithm also favors nodes that are closer together. The farther apart the nodes are, the higher the kcost.

2. Path Matching

Path matching is the second stage of processing within the loop matching stage 404. In this stage, loop_match attempts to follow the same path in the Vendor#2 map data as is indicated by the segments of the Vendor#1 loop. The resulting matched path is called a Vendor#2 loop or a Vendor#2 loop path. The links along the path in the Vendor#2 data are subsequently used in the merge stage 407, which then puts the links extracted from Vendor#2 into the corresponding loop in the Vendor#1 data, fleshing out the map in this area of partial Vendor#1 coverage. It is therefore extremely important that the paths cut out by the loops are accurate before entering the merge stage 407.

a. Types of Loop Solutions

Loop path solutions fall into these categories: exact mirror, usable, and unacceptable. An exact mirror loop solution is one in which both data sets have very similar representations of all road formations along the Vendor#1 loop. This solution is the easiest to automate. However, because differences in the data sets, creating an exact mirror may not create a viable solution in a small percentage cases. A usable loop solution is one created by someone who understands the way the merge algorithm works. This type of solution can be made by using manual shortcuts to avoid introducing a problem through areas of mismatched data. An unacceptable loop solution is one in which, in mirroring the Vendor#1 route, the result is unusable to the merge process.

b. Path-Matching Heuristics

An algorithm that may be used for path matching generates paths from one control node pair to another by attempting primarily to travel in the same direction of travel as the Vendor#1 loop is "traveling" (according to the right-turns-only or left-turns-only definition of the loop), at what the algorithm decides is the closest mirror point in the Vendor#1 data to the current position at the end of an incomplete path in Vendor#2. To compensate for the many potential inconsistencies in the two map data sources, a wide variety of heuristics can be used to adjust where the algorithm believes this closest Vendor#1 reference point is. Typically, these heuristics first compute the physically nearest point on Vendor#1 to the current point at the end of the Vendor#2 path. The algorithm then begins a search to compensate for inconsistencies in position, formation, street names, etc. Since the algorithm has already identified all the common control node points, the search for Vendor#1 mirror points results in searching for "weak bonds", which are inherently unreliable. The heuristics can be based around such approaches as trying to look for the same pair of street name changes when the street name can possibly change at the end of the current Vendor#2 path, which occurs in a small minority of cases, or positions where the street names do not change yet. Common bends in the road nearby can also be used. In most cases, the algorithm simply advances along the Vendor#1 path to the next shape point. When there are ambiguous situations in conditions where there are multiple branches at a node, the algorithm can default to generating a Vendor#1 path point that travels in as similar a direction as possible compared to the current direction of travel at the end of the incomplete Vendor#2 path.

To complicate matters, a single intersection can have as many as 20 mirror points on Vendor#1, each of which is selected as a bias for one of the fork selection heuristics. The selection algorithm that is based upon common name changes, for example, needs to know if the Vendor#1 path ever gets to the same street. The ultimate link selection algorithm is based around choosing the link which yields the lowest angular difference score as compared to the direction of current travel of it's mate on Vendor#1. The differences in angles are highly biased by multiplying the angular differences based on constants assigned to factors such as synchronized street names, synchronized road type, and one way direction of travel.

According to one embodiment, the basic path searching algorithm is based around a stack. The algorithm starts at one pair of control nodes and tries to determine how to get to the next pair by traveling along road links in the Vendor#2 data, in a pattern consistent with the direction of travel of the Vendor#1 loop path, modified as described above. Each algorithm iteration places each successive possible additional link that may form the next step of the path onto the stack. When the algorithm fails to reach the destination or violates search constraints (such as the distance from the Vendor#1 loop), it backs out of the last link put on the stack and retries another direction. When the algorithm reaches the destination control node, it traverses the links and nodes stored in the stack, and writes the resulting path to a file.

Figure 8:
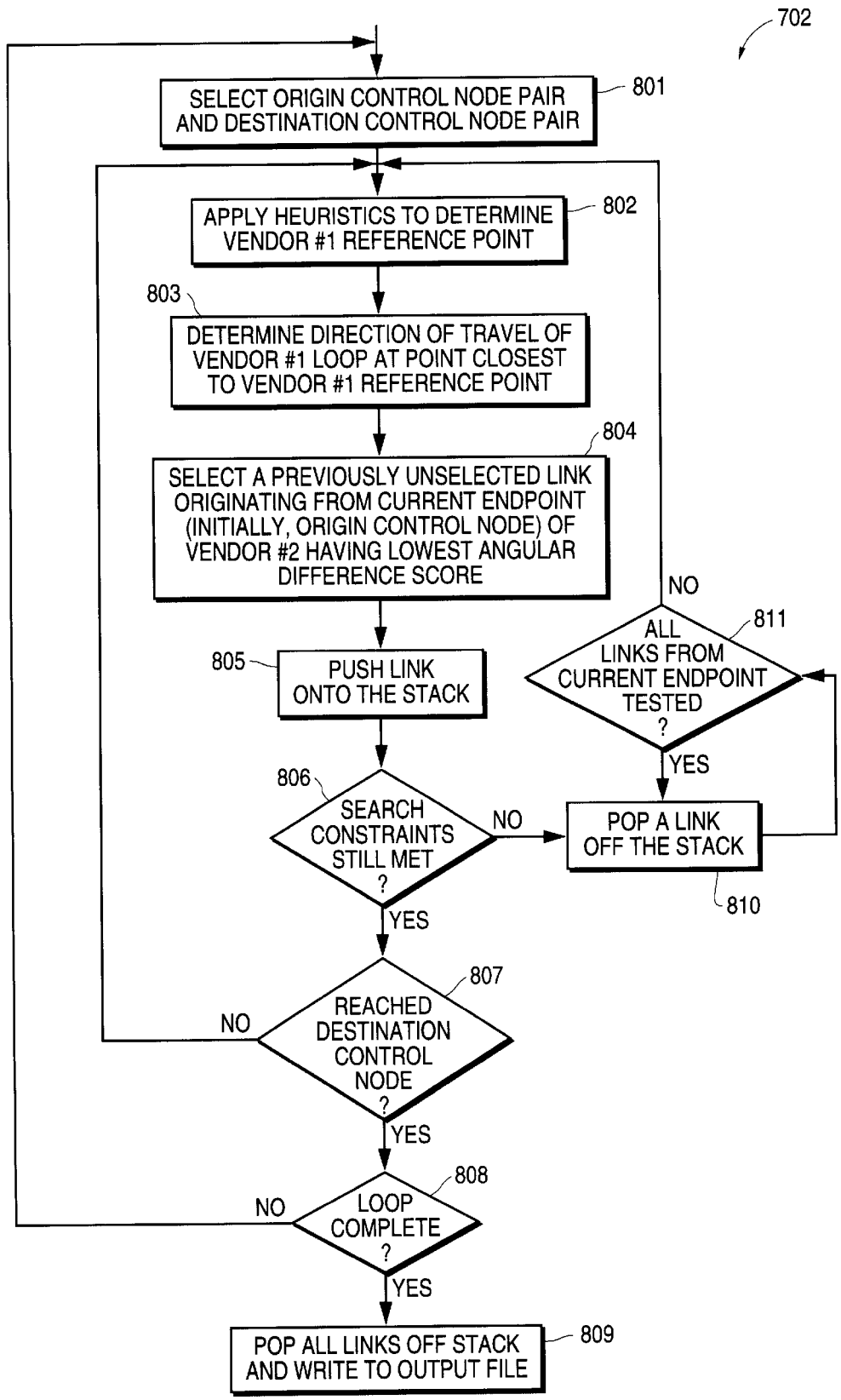
FIG. 8 is a flow diagram illustrating a path matching portion of the loop matching stage.

FIG. 8 illustrates the algorithm of the path matching stage 702 for a given loop, according to this embodiment. At stage 801, an origin control node pair and a destination control node pair are selected. Again, each control node pair includes a control node from Vendor#1 data and a control node from Vendor#2 data. At stage 802, the heuristics are applied to determine the Vendor#1 reference point, i.e., the closest mirror point in the Vendor#1 data to the current position at the end of an incomplete path in the Vendor#2 data. The direction of travel of the Vendor#1 loop at the point in the path closest to the reference point is then determined at stage 803. At stage 804, a selection is made of a previously unselected link that originates from the current Vendor#2 endpoint (initially, the Vendor#2 origin control node) and has the lowest angular difference score. This link is then pushed onto a stack at stage 805. If all of the search constraints are still satisfied (stage 806), then it is determined at stage 807 whether the destination control node of Vendor#2 has been reached. If not, the process repeats from stage 802. If so, the process proceeds to stage 808.

If all of the search criteria are not satisfied by the currently selected link at stage 806, then that link is popped off the stack at stage 810. If there are more links originating from the current endpoint which have not yet been tested (stage 811), then the process repeats from stage 802; otherwise, the process repeats from stage 810 by popping another link off the stack.

If the destination control node has been reached at stage 807, then if the loop is not yet complete, the process repeats from stage 801; specifically, the current destination control node is taken as the new origin control node, and a new destination control node along the loop path is selected. If the loop is complete at stage 808, then at stage 809, all of the links are popped off the stack and written to an output file for the current loop, comprising the link ID for every link in the stack.

E. Error Correction

Since the original data sets were created by humans, they are likely to contain many inconsistencies and other problems that make error correction necessary. The loop matching stage 404 may not resolve all of the inconsistencies between the Vendor#1 and Vendpr#2 data sets. Therefore, the loops may require human inspection and alteration to achieve the desired degree of reliability. It is noted that the error detection stage 405 can be entirely automated by applying strict rules checking to identify and correct improper matches of loops. However, better reliability is likely to be achieved by adding human intervention at this point in the process. Thus, in one embodiment the software 14 includes the GUI tool (FIG. 2B) for this purpose. This GUI tool loads four files: 1) the map file extracted by loop_extract for the Vendor#1 data; 2) the map file extracted by loop_extract for the Vendor#2 data; 3) make_loop's Vendor#1 loop file; and 4) loop_match's match file, which contains the Vendor#2 loop path. The GUI tool creates a multi-colored display in which each vendor's map data is shown in a different color, superimposing the maps and loops. With this display, one or more trained inspector-adjusters can examine the decisions that were made by the loop_match program's attempt to create a Vendor#2 loop and, if needed, make changes.

The role of the inspector-adjuster at this stage of processing is to resolve the cases which the computer cannot correctly resolve. This process ideally entails having people who understand how the subsequent processing steps behave when the final maps are generated. The simple decisions of making exact matches between the Vendor#1 and the Vendor#2 data are performed by the computer algorithms of loop_match. The more difficult judgments may require a human being to examine the loops, complete the loops that the computer could not complete, and in many cases alter the loops when the exact match will produce a bad merge. There is no systematic way to describe the judgments that a human may have to make—all of the systematic judgments are made by loop_match. The human's role is primarily to intervene when his superior spatial knowledge and knowledge of how maps are made and used by people cause him to believe that the systematic matching algorithm is in error.

The most common judgments that the human has to make are likely to be cases in which control node pairs have been badly matched. The loop_match algorithm is designed to generate exact matches whenever possible, and to make guesses when exact matches are not possible. When the algorithm makes guesses, it can make mistakes occasionally, requiring a human to catch these mistakes. Typical examples of bad control node pairs are when the computer attempts to assign a pair to match up intersections where the street names are recorded incorrectly in the source data. The computer will assume that the intersection of, for example, Fifth Street and Omaha Street will be the same physical location on both maps. But a human looking at the map will often catch that the image of the maps are very similar but the control nodes are not lined up with the image of the streets. This may happen, for example, in a case when Omaha Street in one map should have been Dalton Street; hence, the human will put the control node pairs at Fifth Street and Omaha Street on one map, and at Fifth Street and Dalton Street on the other map, the same physical location on both maps.

Another case which may require human intervention is when the path matching algorithm of loop_match "travels" down the wrong street. The path matching algorithm may become confused when the maps are not perfectly synchronized. The algorithm starts the Vendor#2 loop path from one control node pair and is supposed to get to the next control node pair by following the same path as Vendor#1 follows; however, the algorithm may err in a decision and travels down the wrong street in the Vendor#2 data on its way to the equivalent Vendor#2 control node pair. In that case, the human inspector-adjuster has to enter inputs to the GUI tool to redirect the Vendor#2 loop path down the correct path, such as by clicking on the correct links.

In some cases, it may be necessary for the human inspector-adjuster to add artificial links which do not end up in the final product. These artificial links serve to cause the subsequent processes to bypass areas of both maps (Vendor#1 and Vendor#2) that are incompatible.

Human inspector-adjusters can become fatigued, and some understand the problems better than others. Consequently, a second pass through the data may be desirable to catch any errors that were undetected by the first pass. Therefore, in one embodiment, once a loop has been evaluated by a human being during the error detection and correction stage 405, it goes to a second stage within the error detection and correction stage 405, known as Quality Control. In Quality Control, a second inspector-adjuster examines and repairs any actual mistakes made by the first inspector-adjuster. The second inspector-adjuster is assisted by two modules of software 14 in addition to the GUI tool, known as loop_check and loop_diff. These two programs issue warning reports for every possible error made by both the computer and by the first human inspector. The error reports are generated by using the confidence level and kcost calculations from the source code of the loop_match program. These two programs issue warning reports when a choice has been made that generates spurious low confidence or high kcost scores. Additionally, they issue warnings when road names or road classifications appear inconsistent between the Vendor#1 and Vendor#2 loops.

These two programs serve two different functions: Loop_check reports on any questionable decision made by the loop_match program and any suspicious matches on the part of the human inspector-adjuster. Loop_diff reports on any specific changes made to the loop by the inspector-adjuster. The reports issued by these programs are English language descriptions of evaluations of the quality of the decisions that have been made so far on the loop. Each individual discrepancy the program sees is assigned a priority based upon the severity and likelihood of this class of problem actually being an error in the loop. The loop_check program reports on every possible hedging decision made by the computer or the human and may therefore output many more error reports than loop_diff does.

F. Eliminating Duplicates

Following detection and correction of errors at stage 405, duplicate links are eliminated at stage 406. Under normal circumstances all the data that comprise the path in the Vendor#2 loop are not duplicated in the final product. Only those links inside the loop are actually propagated. However, there may be loops in the Vendor#1 data with certain formations that are intended to be bypassed. Bypassing these formations, which are common between the two data sets, prevents the removal from the final product of the Vendor#2 links which duplicate the links of these Vendor#1 formations.

Vendor#1 may provide arbitrary coverage of some local roads in partially digitized areas. A "partially digitized" area is an area for which the vendor has not guaranteed complete coverage. This can introduce a problem when some of these arbitrary roads appear inside a loop in one of these above-mentioned formations. These formations result when a Vendor#1 link protrudes from a loop path and does not return to the loop via another link. In other words, a single road at right angles to the path of a loop may confuse the algorithm, because the loop does not contain information describing which way to go when the node at the intersection of the three way branch is encountered. In some cases, these single roads may be the only inlet to some rather large areas, generating formations that look like mushrooms, with the three way branching node as the base of the stem of the mushroom.

One possible approach is to implement logic that will recognize conditions such as the previous position along the loop to make determinations of which branch to follow at that node when that node was encountered. Another, perhaps easier approach is to manually flag duplicate links that are part of the corresponding formations in the Vendor#2 data and later decide whether to display Vendor#2 or Vendor#1 data, both, or neither, in these areas.

G. Merging Loops

Following the elimination of duplicate links, the Vendor#1 loops and the Vendor#2 loops are merged in stage 407. Once an entire geographical region has been inspected by Quality Control, its data is passed to the loop_merge module of software 14. Loop_merge, in conjunction with the link_move program described below, effectively cuts out all of the links inside the Vendor#2 loop corresponding to a given Vendor#1 loop and pastes them into a Vendor#1 map. This fills in the holes in the Vendor#1 data.

Figure 9:
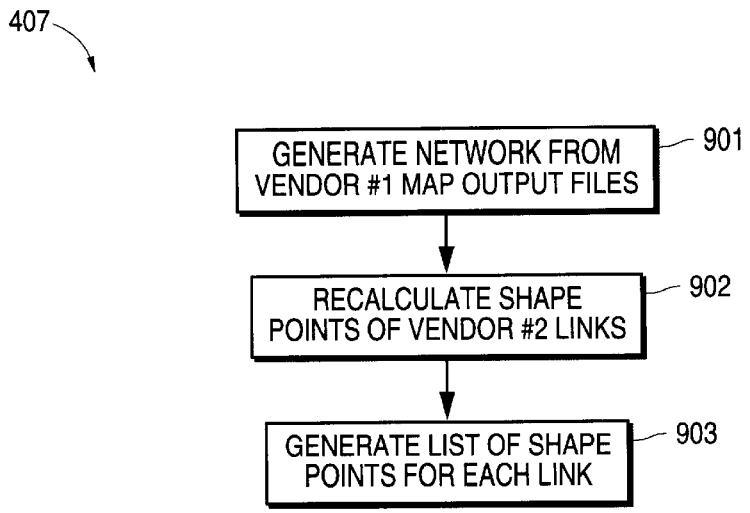
FIG. 9 is a flow diagram illustrating a loop merging stage.

The loop merging stage 407 is shown in greater detail in FIG. 9, according to one embodiment. Loop_merge first generates a network out of the extracted map files at stage 901. At stage 902, the program then looks to the path of links between each pair of Vendor#2 control nodes and looks for Vendor#2 links that branch off of this path. It takes the position of the Vendor#1 control nodes and the Vendor#2 control nodes for reference and shifts all of the Vendor#2 links to positions along the Vendor#1 loop path to positions which have the same relative distance along the Vendor#2 links. This shifting operation is simply a recalculation of the shape points of the Vendor#2 links. The output of loop_merge includes a modified list of shape points for each link. As an example, a link that was positioned exactly at the center of the Vendor#2 path between two control nodes would be positioned at exactly one half of the distance along the equivalent Vendor#1 path. A node that branched from the Vendor#2 loop path at a position that was 10% of the distance along the Vendor#2 link path would be placed at an equivalent position that is 10% of the distance along the Vendor#1 path from the equivalent nearby control node.

The shape points of Vendor#2 links inside the Vendor#2 loop that are not directly located on the loop are shifted according to a formula that takes all the control node positions of the loop into account. This formula is shown in the following sequence of C++ code:

```
static Point movePoint(Point dot)
{
    double sWeight=0, xWeight=0, yWeight=0;
    for (int i=0; i<bpCount; i++)
    {
        if (cnList[i]->Vendor#2Dot==dot) return cnList[i]->ntDot;
        double       weight=1/sqrt(cnList[i]->Vendor#2Dot.squareTo(dot));
        sWeight+=weight;
        xWeight+=(cnList[i]->ntDot.x-cnList[i]->Vendor#2Dot.x)*weight;
        yWeight+=(cnList[i]->ntDot.y-cnList[i]->Vendor#2Dot.y)*weight;
    }
    int x=(int)floor(dot.x+xWeight/sWeight+.5);
    int y=(int)floor(dot.y+yWeight/sWeight+.5);
    return Point(x, y);
}
```

In the above segment of code, cnList is the control node list. A Point is a class containing integer fields of x and y. The variable name notation Dot refers to an X-Y coordinate point. Of course, other formulas can also be used.

The output of loop_merge is a file containing "instructions" to be used by the program link_move, on how to place each Vendor#2 link that is to be extracted from Vendor#2. Each move instruction includes the link ID of each Vendor#2 link with the associated shape points, shifted according the above formula.

H. Correcting Merge Point Inconsistencies

Figure 10:
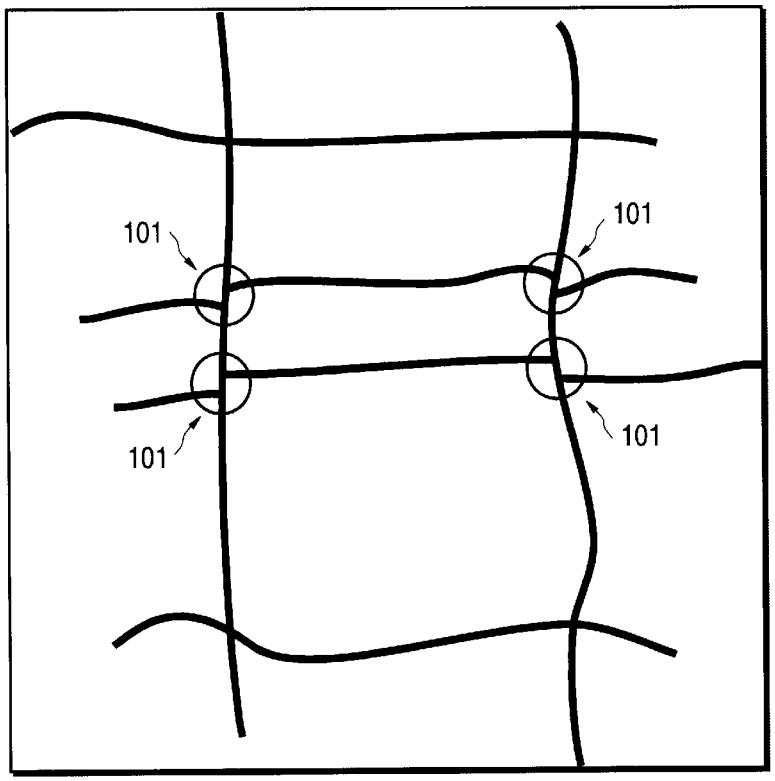
FIG. 10 shows the effect of merge point inconsistencies resulting from the loop merging stage.

Following the loop merging stage 407, merge point inconsisencies are corrected at stage 408. The loop_merge algorithm can stretch roads in adjacent loops in a manner that makes the road appear disconnected. That is, a road may connect to the Vendor#1 loop in a different place on each side of the Vendor#1 loop. This effect is illustrated in FIG. 10, in which the inconsistencies appear within circles 101. These broken roads must be corrected so that they display as continuous roads, as they were represented in the original Vendor#2 data. Any such misalignments are detected at this stage of processing by the pair_merge module of software 14.

Pair_merge has two different modes of operation. The first mode produces a list of merge point inconsistencies where straight roads that previously connected at a single node in the original Vendor#2 data now connect to two places in Vendor#1 data, as shown in FIG. 10. Loop_merge is then rerun, using these points to realign the roads, and positioning the two links on either side of the road as close as possible to a point exactly between the two re-aligned positions. The second mode of pair_merge is used after loop_merge makes the initial corrections. When pair_merge continues to detect disconnect problems where two links continue to be disconnected, but were connected in Vendor#2 data, this position is a double-digitized road, where the Vendor#2 data showed only a single link for this road. Loop_merge simply generates a list of links that need to be added to bridge any merge points, using the assumption that a missing overpass must be added over the two Vendor#1 lanes.

I. Generating the Combined Output Files

After removing merge point inconsistencies at stage 408, the final output file or files representing the combined Vendor#1 data and Vendpr#2 data is generated at stage 409. The link_move module of the software 14 is used for this purpose. In one embodiment, link_move creates a number of new output DCA files. Link_move loads the original Vendor#1 map and then iterates through each of the loops, executing the move instructions in the output of loop_merge, copying the Vendor#2 links onto a new dca file, preserving the both the Vendor#1 and Vendor#2 link IDs. Thus, there are many duplicate link IDs in these output DCA files.

These DCA files are not quite yet ready for use as general purpose map data. The problem is that the Vendor#1 links are not yet broken at the intersection points where the Vendor#2 links are supposed to branch off. Thus, another output of loop_merge is a "break file", which is a file that specifies these intersection "break" points. At this stage of processing, the break file is loaded and used to create the nodes at these critical places in order for networks to be properly generated on this data.

Thus, a method and apparatus for combining two road map databases of a given geographic region have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A machine-implemented method of combining two road map databases, the method comprising:

accessing a first road map database and a second road map database, the first and second road map databases having different degrees of coverage of a geographic region and having different coverage accuracies for the geographic region; and defining, for the first road map database, a first set of loops including a first plurality of links representing portions of roads within the geographic region covered by the first road map database; wherein each loop of the first database is formed by selecting a starting point and traversing a smallest possible number of intersecting links forming the tightest closed polygon leading back to the starting point;

defining, for the second road map database, a second set of loops including a second plurality of segments representing portions of road within the geographic region covered by the second road map database; and matching loops of the first road map database with loops of the second road map database to generate an output road map database representing a combination of the first road map database and the second road map database.

2. A machine-implemented method as recited in claim further comprising the steps of:

identifying links enclosed within loops of the second road map database; and copying the identified links into loops of the first road map database.

3. A method of combining two road map databases, the method comprising:

defining a first road map database as a set of first loops comprising links, each loop of the first set of loops formed by defining a starting point and forming the tightest closed polygon joining links from the starting point;

defining a second road map database as a second set of loops, each loop of the second set of loops defined to correspond to a single loop of the first set of loops;

identifying links included within each set of loops, the links representing portions of roads;

creating an output road map database to represent a combination of the first roadmap database and the second road map database, based on the identified differences in coverage.

4. A method of combining two road map databases, each including data defining a plurality of roads, the method comprising:

defining a first set of loops from roads represented in a first road map database, each loop of the first set of loops formed by defining a starting point, forming the tightest closed polygon joining links from the starting point;

for each of the first set of loops, identifying a corresponding loop from roads represented in a second road map database, to define a second set of loops, wherein each loop of the second second of loops may include one or more links, each link representing a portion of a road represented in the second road map database;

creating a set of output loops corresponding to the first set of loops to form an output road map database; and copying links enclosed within loops of the second set of loops and not represented in the first road map database into the set of output loops, such that the output road map database represents a combination of the first road map database and the second road map database.

5. A method or combining two road map databases that have different coverage of the same geographic area, each including data defining a plurality of roads, the method comprising:

storing a first road map database and a second road map database, wherein the first and second road map databases have different degrees of coverage of a given geographic region;

defining a first set of loops from roads represented in a first roadmap database, wherein each loop of the first set of loops may contain one or more links, each link representing a portion of a road represented in the first road map database, and wherein each loop of the first database is formed by selecting a starting point and traversing a smallest possible number of intersecting links forming the tightest closed polygon leading back to the starting point;

matching each loop of the first set of loops with a loop of a second set of loops, the second set of loops defined from roads represented in the second road map database, wherein each loop of the second set of loops may contain one or more links, each link representing a portion of a road represented in the second road map database;

checking results of said matching for accuracy and correcting efforts in the results, if any;

defining an output road network as set of loops to corresponding to the first set of loops;

adjusting particular links of the second set of loops to correct for differences between the first road map database and the second road map database;

for each loop of the second set of loops, copying links of said loop that are not represented in the first road map database into the corresponding loop of the output road network, such that the output road network represents a combination of the first road map database and the second road map database.

6. A machine-implemented method of recited in claim 5, wherein the second road map database has more complete coverage of the geographic area than the first road map database but lower accuracy than the first road map database.

7. A machine-implemented method as recited in claim 5, further comprising, prior to said matching:

creating a first set of output map files from the first road map database, each of the first set of output map files corresponding to a different loop of the first set of loops, each of the first set of output map files indicating the link, if any, that are included without a region enclosing the corresponding loop of the first set of loops;

creating a second set of output map files for the second road map database, each of the second set of output map files corresponding to a loop of the first set of loops and including one or more links represented in the second road map database.

8. A machine-implemented method of matching data of a first road map database with data of a second road map database, the method comprising:

inputting data of the first road map database in the form of a first set of loops, each loop of the first set of loops including a plurality of links, and formed by selecting a starting point and traversing a smallest possible number of intersecting links the tightest closed polygon leading back to the starting point, wherein each link represents a portion of a road;

matching each loop of the first set of loops with a loop of a second set of loops corresponding to the second road map database, by identifying a set of nodes, each node representing an intersection of two or more roads, the set of nodes including a plurality of nodes of the first road map database and a plurality of nodes of the second road map database, and defining each loop of the second set of loops by identifying paths between nodes of the second road map database which match paths between corresponding nodes of the first road map database.

9. A machine-implemented method as recited in claim 8, wherein said identifying paths between nodes of the second road map database which match paths between corresponding nodes of the first road map database comprises using a set of heuristics to identify the paths.

10. A machine-implemented method of recited in claim 8, wherein said assigning a set of nodes comprises:

identify a plurality of control nodes of the first road map database, and identifying a plurality of control nodes of the second road map database, such that each control node of the second road map database corresponds to a control node of the first road map database.

11. A machine-implemented method as recited in claim 8, further comprising shifting particular links in the second set of map output file to correct for positional inconsistencies between the first road map database and the second road map database.

12. A machine-implemented method as recited in claim 8, further comprising correcting misalignments of particular links in the second set of map output files between adjacent loops of the road network to eliminate discontinuities in represented roads.

13. A method of matching data in a first road map database with data in a second road map database, the method comprising:
 defining data of the first road map database as a first set of loops, each loop of the first set of loops including a plurality of segments, each segment representing a portion of a road, wherein each loop of the first road map database is formed by selecting a starting point and traversing a smallest possible number of intersecting links to form the tightest polygon to the starting point;
 matching each loop of the first set of loops with a loop of a second set of loops corresponding to the second road map database said matching including
  assigning a set of control nodes, each control note representing an intersection of two or more roads, wherein said assigning includes
   identifying a plurality of control notes of the first road map database, and
   identifying a plurality of control notes of the second road map database, such that each control node of the second road map database corresponds to a control node of the first road map database; and
  defining the second set of loops by heuristically determining paths between control nodes of the second roadmap database which match paths between corresponding control nodes of the first road map database, each path including one or more links;
   shifting particular links in the second set of map output files to correct for positional inconsistencies between the first road map database and the second road map database; and
   correcting misalignments of particular links in the second set of map output files between adjacent loops of the road network to eliminate discontinuities in represented roads.

14. A method of combining two road map databases that have different coverage of the same geographic area, each including data defining a plurality of roads, the method comprising:
 storing a first road map database and a second road map database, wherein the second road map database has more complete coverage of the geographic area than the first road map database but lower accuracy than the first road map database;
 defining a first set of loops from road represented in the first roadmap database, wherein each loop may contain one or more links, each link representing a portion of a road, and wherein each loop of the first set of loops formed by defining a starting point and forming the tightest closed polygon joining links from the starting point;
 extracting road map data from the first road map database and the second road map database, including
  creating a first set of output map files from the first road map database, each of the first set of output map files corresponding to a different loop of the first set of loops, each of the first set of output map files indicating the links, if any, that are included within a region enclosing the corresponding loop of the first set of loops;
  creating a second set of output map files from the second road map database, each of the second set of output map files corresponding to a loop of the first set of loops and including one or more links represented in the second road map database;
 matching each loop of the first set of loops with a loop of a second set of loops corresponding to the second road map database, using the first set of output map files and the second set of output map files, wherein the second set of loops is defined by roads represented in the second road map database, wherein said matching includes
  assigning a set of control notes, each control note representing an intersection of two or more road, wherein said assigning includes
   identifying a plurality of control nodes of the first road map database, and
   identifying a plurality of control nodes of the second road map database, such that each control node of the second road map database corresponds to a control node of the first road map database; and
  defining the second set of loops by determining paths between control nodes of the second road map database which match paths between corresponding control nodes of the first road map database;
 checking results of said matching for accuracy and correcting errors in the results, if any, wherein said checking and correcting include
  automatically performing a first stage of said checking and correcting based on a predefined algorithm;
  performing a second stage of said checking and correcting by receiving and implementing user inputs specifying corrections;
 generating a road network from the loops defined by the first set of output map files;
 adjusting particular links in the second set of map output files to correct for positional inconsistencies between the first road map database and the second road map database;
 correcting misalignments of particular links in the second set of map output files between adjacent loops of the road network to eliminate discontinuities in represented roads;
 for each loop of the second set of loops, copying the included links that are not represented in the first road map database into the corresponding loop in the road network; and
 copying the road network into a new database representing both the first road map database and the second road map database.

15. An apparatus for combining two road map database, the apparatus comprising:
 means for accessing a first road map database and second road map database, the first and second road map databases having different degrees of coverage of a geographic region and having different coverage accuracies for the geographic region; and
 means for defining, for the first road map database, a first set of loops including a first plurality of links representing portions of roads within the geographic region covered by the first road map database; wherein each loop of the first database is formed by selecting a starting point and traversing a smallest possible number of intersecting links forming the tightest closed polygon leading back to the starting point;

means for defining for the second road map database, a second set of loops including a second plurality of segments representing portions of roads within the geographic region covered by the second road map database; and means for matching loops of the first road map database with loops of the second road map database to generate an output road map database representing a combination of the first road map database and the second road map database.

16. An apparatus for combining two road map database, each including data defining a plurality of roads, the apparatus comprising:

means for defining a first set of loops from roads represented in a first road map database;

means for defining a first road map database as a set of first loops comprising links, each loop of the first set of loops formed by defining a starting point and forming the tightest closed polygon joining links from the starting point;

means for defining a second road map database as, a second set of loops, each loop of the second set of loops defined to correspond to a single loop of the first set of loops;

means for identifying, for each of the first set of loops, a corresponding loop from roads represented in a second road map database, to define a second set of loops, wherein each loop of the second set of loops may include one or more links, each link representing a portion of a road represented in the second road map database;

means for creating a set of output loops corresponding to the first set of loops to form an output road map database; and means for copying links enclosed within loops of the second set of loops and not represented in the first road map database into the set of output looks, such that the output road map database represents a combination of the first road map database and the second road map database.

17. A processor system comprising:

a processor;

a first storage facility coupled to the processor, the first storage facility storing a first road map database;

a second storage facility coupled to the processor, the second storage facility storing a second road map database, the first and second road map databases having different degrees of coverage of a geographic region and having different coverage accuracies for the geographic region; and a third storage facility coupled to the processor, the third storage facility storing sequences of instructions which configure the processor to:

access the first road map database and the second road map database;

defining a first road map database as a set of first loops comprising links, each loop of the first set of loops formed by defining a starting point and forming the tightest closed polygon joining links from the starting point;

defining a second road map database as a second set of loops, each loop of the second set of loops defined to correspond to a single loop of the first set of loops;

identify links included within each set of loops, the links representing portions of roads;

identify differences in coverage between the first toad map database and the second road map database based on the sets of loops; and create an output road map database to represent a combination of the first road map database and the second road map database, based on the identified differences in coverage.

18. A machine-readable storage medium storing a road map database of a geographic region, the road map database representing a computer-generated combination of a first road map database and a second road map database, the first road map database and the second road map database differing in degree of coverage and accuracy of coverage of the geographic region, the road map database including a plurality of loops, each loop defined as a plurality of links, each link representing a portion of a road represented in both the first road map database and the second road map database, the road map database further including a plurality of links enclosed within particular ones of said loops, wherein the plurality of links enclosed within particular ones of said loops include links that are represented in the second road map database but not the first road map database, and wherein each loop of a first set of loops of the first road map database are formed by defining a starting point and forming the tightest closed polygon joining links from the starting point.

19. An apparatus comprising:

means for inputting data of a first road map database as a first set of loops, each loop of the first road map database including a plurality of segments and formed by defining a starting point, forming the tightest closed polygon joining links from the starting point, each segment representing a portion of a road;

means for matching each loop of the first set of loops with a loop of a second set of loops corresponding to a second road map database, the means for matching including means for assigning a set of control nodes, each control node representing an intersection of two or more roads, the set of control nodes including a plurality of control nodes of the first road map database and a plurality of control nodes of the second road map database, and means for defining each loop of the second set of loops by identifying paths between control nodes of the second road map database which match paths between corresponding control nodes of the first road map database.

* * * * *